Aug. 16, 1955

PAO H. CHIN 2,715,706

MOTOR CONTROL CIRCUIT

Filed Nov. 30, 1949

INVENTOR.
Pao H. Chin
BY
Bohleber, Jaxetto Monkstream
ATTORNEYS

Aug. 16, 1955

PAO H. CHIN 2,715,706

MOTOR CONTROL CIRCUIT

Filed Nov. 30, 1949

INVENTOR.
Pao H. Chin
BY
Bohleber, Jansen & Mintstream
ATTORNEYS

United States Patent Office 2,715,706
Patented Aug. 16, 1955

2,715,706

MOTOR CONTROL CIRCUIT

Pao H. Chin, Elizabeth, N. J., assignor to Continental Engineering Corporation, Flemington, N. J., a corporation of New Jersey Application November 30, 1949, Serial No. 130,171

21 Claims. (Cl. 318—264)

The invention relates particularly to a motor control circuit for a motor which has movement in one or a forward direction of rotation and in the other or a reverse direction of rotation. The motor control circuit has particular applicability for the closing and opening of a door, valve and the like and the circuit herein is designed particularly for the operation of bulkhead doors on ships. The invention also relates to a motor control circuit for a motor having one direction of rotation.

It is the principal object of the invention to construct a self-restoring motor control circuit which functions to disconnect the motor circuit in the event the motor current increases substantially but which is rendered inoperable for a brief period when the motor is first energized until it reaches a speed at which the starting current is entirely or substantially reduced.

Another object is to construct a combination motor circuit and motor control circuit for a reversing motor such as for door operation and the like in which the circuit is disconnected under heavy current but is automatically reset for further operation and which is rendered inoperable for a brief initial period when the motor is started.

A further object is to construct a new and novel motor control circuit which functions to open the circuit upon a heavy current through the motor circuit and is automatically reset for another control operation.

A further object is to provide a motor control circuit which closes a door under heavy torque by an automatically resettable circuit.

A still further object is to provide a circuit which performs the above functions but requires only five wires between the central station and the local station.

Another object is to include a reset circuit for an overload relay or means in the motor circuit.

Other objects of the invention are more apparent from the following description when taken in connection with the accompanying drawings illustrating preferred embodiments of the circuit in which.

Figure 1:
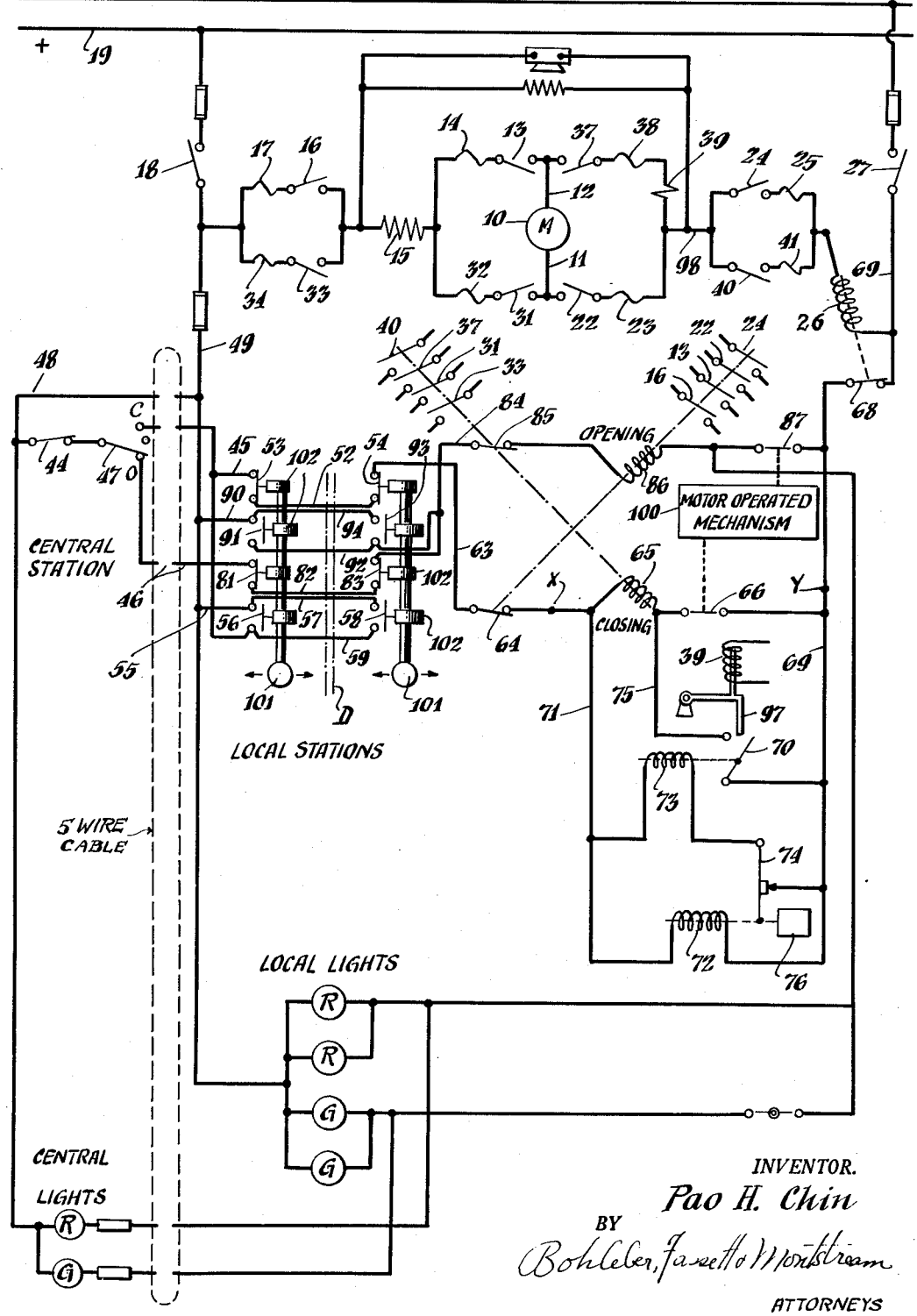
Figure 1 shows diagrammatically the motor circuit and the motor control circuit.

The control circuit for a reversing motor functions to disconnect the motor from its power supply in the event the motor current becomes excessive in one direction of its rotation. For a door operating mechanism on a ship the circuit operates in this manner when the door is closing although the circuit may be connected in a reverse manner to operate when the door is opening; however, for ship bulkhead door operation, it is the closing operation which is more critical and jamming of the door by an obstruction is more likely to occur. For operation of a valve or other equipment, it may be connected so that it functions either in the closing or the opening of the valve or both as desired.

The motor circuit is adapted to be connected with a motor 10 and includes connections 11 and 12 adapted to be connected with the armature of the motor. The forward or door opening circuit to the motor includes contactor means such as a contactor or switch 13 connected with the connection 12 and may include a blow-out device 14 in series therewith, the series field winding 15 of the motor, a normally open contactor 16, and a second blow-out device 17 in series therewith which is connected with a main motor switch 18. The switch is adapted to be connected with one wire 19 of a power line. The door opening circuit also includes a contactor 22 which may have a blow-out device 23 in series therewith, a contactor 24 which may have a blow-out device 25 in series therewith. An overload relay 26, indicated as a thermotype, may be connected in series with both forward and reversing circuits and a motor switch 27 which is adapted to be connected with the other wire 28 of a power line.

For reversing the rotation of the motor, which when used for operating a bulkhead door would be the closing operation, there is included a normally open contactor 31 which may have a blow-out device 32 connected in series therewith which in turn is connected with the motor series field winding 15. The series field winding is in turn connected with a normally open contactor 33 which may have a blow-out device 34 in series therewith which is in turn connected with the switch 18.

The reverse rotation of the motor, or the closing door motor circuit, also includes a normally open contactor 37 connected with the connection 12, which may have a blow-out device 38 in series therewith, and a torque current relay 39 also connected in series. The reverse rotation of the motor circuit also includes a normally open contactor 40 which may have a blow-out device 41 in series therewith which is then connected with the overload relay 26.

The line contactor 16 and the blow-out device 17 are connected in parallel with the line contactor 33 and blow-out device 34. This parallel circuit may be substituted by a single normally open contactor as will be discussed more fully hereinafter or may be dispensed with. The contactor 24 and blow-out device 25 is connected in parallel with the contactor 40 and blow-out device 41 which parallel circuit may be dispensed with if desired and a direct connection provided with the overload relay 26 or a single normally open contactor may be used if desired operated by relays in both the forward control circuit and the reverse control circuit. In other words the single line contactor may be connected with and operated by the two separate control circuit operating relays which will be described hereinafter. Contactors 13 and 22 are essential as one set of contactors for the opening or forward motor circuit and contactors 31 and 37 are essential for the reversing or door closing motor circuit. The other contactors are desirable but not essential for a series field wound motor.

The operation of the contactors in both of the motor circuits is controlled by a motor control circuit which is in two parts, namely: a central station and local station. The central station may be located such as on the bridge of a ship or any central point. The local station is provided at the bulkhead door and upon both sides thereof or at the valve or other equipment to be operated by the motor. Whether one or more stations is provided, manually operated switch means includes the switches provided at each station. For enabling a bulkhead door to be opened or closed there are three such stations or switches disclosed herein. The central station may include a time switch 44 which is connected with a central station switch 47 which is manually operated to connect with a closing control circuit 45 or an opening control circuit 46. The switch 44 is connected by a connection 48 and 49 with the motor switch 18 and therethrough with the power line wire 19.

The closing control circuit from the central station has a connection with a normally closed local station switch 53 on one side of a bulkhead door D which switch in turn has a connection 52 with a second normally closed local station switch 54 on the other side of the bulkhead door. A parallel switch circuit connected directly with connection 49 includes a wire 55 connected with a switch 56 on one side of the bulkhead door D and a direct connection 57 with a local control switch 58 on the other side of the door which switch is directly connected by connections 59 and 60 with switch 53. It will be noted therefore, that the switches 56 and 58 by-pass or shunt the central control switches 44 and 47 and can operate the door or the motor circuit when the central control switch is in disconnected or neutral position N.

The switches 53, 56 and 81, 91 are operated by cams 102 mounted upon one shaft with a handle 101 which has a central position and a left and a right position. The switches are shown with the shaft or handle therefor in central position. When the handle is moved to door opening position, switch 53 opens and switch 91 closes. When the door handle is moved to door closing position, the switch 81 opens and 56 closes. The switches 54, 93 and 58, 83 operate in the same manner for door opening or door closing control.

The switch 54 has a connection 63 with a normally closed contactor 64 which is connected in series with a door closing or motor reversing control relay 65, a normally open torque contactor 70, a connection 69 and a normally closed overload contactor 68 and a connection 69 with the motor switch 27 and the power line 28. A closed door limit switch 66 may be provided, if desired, connected in series with the relay 65 and in shunt with the torque contactor 70.

The control circuit operating relay 65 and torque contactor 70, which includes the closed door limit switch 66, are also shunted by two parallel circuits through a connection 71, the first shunt circuit including a time delay relay 72 and the second shunt circuit includes a torque relay 73 in series with a normally closed time delay contactor 74.

The local control circuit for forward rotation of the motor or for opening the door also includes a local switching system which is connected through the central control or directly connected with the connection 49 to by-pass or shunt the central control. If the switch 47 is connected with the contact O as illustrated, there is a connection 46 with a local control switch 81 on one side of the bulkhead door D which switch has a connection 82 with a local control switch 83 on the other side of the bulkhead door which in turn is connected with a connection 84, with a normally closed contactor 85, a relay 86 in series therewith. There may also be connected in series an open limit switch 87 which is in turn connected with the overload relay 68.

The direct connection with the wire 49 includes a connection 90, a local control switch 91 on one side of the bulkhead door which has a connection 92 with the wire 84. There is a direct connection 94 between wire 90 and the switch 93.

The switches and their connections constitute one form of a manual switching means for enabling the motor to be rotated forwardly or in reverse from any one of three stations, i. e. one central station and two local stations. So long as one switch is operated, the other switches are of no effect. In other words when the door is closing, it is not possible for anyone at another switch to operate the door opening circuit. Although the switches at each station for the same control operation are connected in parallel with respect to each other, the switch means taken as a unit is connected in series with the other elements of their respective control circuit.

The torque control means includes the relay 73 which operates to close the torque contactor or switch 70 and closes the circuit therethrough. A latch 97 which is shown as a mechanical catch holds the switch 70 closed when once it is closed. The torque relay 39 in the motor circuit is connected with the latch and when the current therethrough is high, the relay is energized to operate and unlatch the latch 97. The time delay relay 72 of the time delay contactor 74 also participates in this operation as will now be described.

When it is desired to operate the motor in one direction which in the bulkhead door operation would be the closing of the door, the time delay relay 72, which is a voltage relay, would normally open the contactor 74. The time delay relay has a delay means connected therewith such as a dash pot 76 so that contactor 74 remains closed during the period when the motor picks up speed and the starting current drawn by the motor is high. The time delay will normally be set at about four seconds. The relay 73 in series with the contactor 74 is therefore energized and continues to be energized, so long as contactor 74 is closed, so that the contactor 70 is held closed which means that the relay 65 is energized. During this period the torque relay 39 is energized and holds the latch 97 unlatched; however, this is unimportant at this period because relay 73 is energized and holds the contactor 70 closed.

Relay 65 when energized closes the contactor means in the reversing motor circuit, which includes the four contactors 31, 33, 37 and 40 in the circuit particularly illustrated in the drawing, and also opens the normally closed contactor 85 in the forward control circuit so that the forward motor control circuit is rendered inoperative so long as the reversing manual switch is closed. Closing of contactors 31, 33, 37 and 40 routes the current through the motor armature in a reverse direction for reverse rotation of the motor. As previously mentioned if the starting current is heavy enough to energize the current torque relay 39 in the motor circuit and the latch 97 is held in its inoperative or unlatched position, the voltage relay 73 holds the switch 70 closed even though the latch is in unlatched position. During the four second initial period set into the dashpot 76 for the time delay relay 72 the current drawn by the motor decreases to its normal low operating current whereupon the torque relay 39 is deenergized and the latch 97 comes into operation to hold the switch 70 closed. The time delay relay opens the contactor 74 which deenergizes the voltage relay 73 but the latch 97 holds contactor 70 closed. The circuit operation for motor reverse rotation will be described, the circuit not including the closing limit switch 66. If the door in the closing movement should strike an obstruction, the motor would slow down and heavy current through the motor, less than that to energize the torque relay 39, would provide large torque to push the obstruction aside. If a heavier current flows through the motor, the current torque relay 39 would be energized to release the latch 97, contactor 70 would open thereby deenergizing relay 65 and the contactor means or all of the contactors in the motor circuit controlled thereby would return to their normal open position. The circuit through the motor is broken and the closing of the door is stopped. The circuit elements are, however, automatically reset for again operating the motor so that removal of the obstruction would permit the operation described.

With the closing limit switch 66 included in the circuit, the operation is as now described. If the door in the closing movement should strike an obstruction, the motor would slow down, heavy current would flow through the motor within the limits of the current torque relay 39 so that it would not be energized to release the latch 97, and the obstruction is pushed aside. When the door reaches a position adjacent to closed position, the limit switch 66 opens but the control circuit continues to function through the switch 70, which is latched closed, until the door is stopped by the jamb whereupon the current through the motor increases for full torque and thereafter increases to energize the torque relay to release the latch 97 and the contactor or switch 70 opens the control circuit, deenergizes coil 65 and the contactors in the motor circuit open. The circuit elements are, however, automatically reset for again operating the motor. If the obstruction is such that the motor current increases to energize the torque relay 39, the latch 97 is released and switch 70 opens; however, since the closing limit switch 66 is closed the control circuit is still closed and the motor continues to operate within the limits of the overload relay until the door is adjacent closed position when the closed limit switch opens and the door completes its closing movement under the inertia of the motor, the door and the operating mechanism.

It will be noted, therefore, that means are provided in the relays 73, 72 and normally closed contactor 74 to hold the torque contactor 70 closed for a predetermined short initial period. Means are also provided to hold the torque contactor 70 closed when once it has been closed which may take various forms, that particularly shown being a mechanical latch 97, which holding means is connected with and operated by the torque relay 39 in the motor control circuit to release the same upon a heavy current through the motor. Also the time delay relay 72 and the contactor or switch 74 opened thereby provide means for opening the shunt circuit which includes the relay 73 after a predetermined short initial period so that the latch 97 will be restored to latch position to hold contactor 70 closed whereby the control circuit is under control of the torque relay 39 for power closing of the door.

Although a blow-out device 17 and 34 is shown for each parallel circuit, a single device may be used in one circuit to each contactor 16 and 33. Similarly contactors 16 and 33 may be a single contactor operable by both relays 65 and 86. The same may apply to the parallel circuits 24, 25 and 40, 41. The simpler construction from a safety, repair and operating standpoint is to have separate contactors for each relay. The contactors 13, 22 and 31, 37 are the essential contactor means for the motor circuit although the others are desirable in the motor circuit.

The switch 66 is a closing limit switch; that is, when the door, valve or other piece of equipment is practically closed, it opens and in the first short opening movement of the door and the like it again closes. It may be operated by the door operating mechanism or by the door. This is for closing movement for doors, valves and the like to close the same under full motor torque. Should the torque relay 39 operate after the initial starting period, the inertia of the moving door, motor and gear mechanism will carry the door to a tight closing after the limit switch 66 has opened the motor circuit. Since the jamming of the door against the door jamb would stop the rotation of the motor and cause increase current to flow through the motor circuit, the torque relay 39 would be energized to unlatch latch 97, open contactor 70 to open the closing control circuit and open the contactors in the motor circuit. In bulkhead door operation it is desirable to have the door pressed against the doorway or bulkhead casing. There are therefore two circuit opening means for the closing operation in the closed door limit switch 66 and the torque control circuit elements. A third is provided in the complete circuit in the overload relay 26 and contactor 68 which, however, would normally not operate.

In the opening operation of the door an open limit switch 87 is provided which is normally closed but opens when the door reaches the limit of its opening movement. As soon as the door begins to close this switch closes. It is the only automatic circuit opening control in the opening movement of the door although release of the manual switch will also stop the door opening movement.

It will be noted that the motor reversing circuit may be used or substituted for the forward control circuit if that should be desired. In such case, the circuit operates in the manner described. By utilizing the reversing control circuit for both forward and reversing control, all reversing control functions are secured in both directions.

The overload relay 26 is set to operate at a heavier current than that which will energize the torque relay 39. If the current through the motor circuit should reach the high value to which this relay is set, the normally closed contactor 68 which is in both the opening door and closing door control circuits would open whereupon the control relay 65 or 86 would be deenergized and their respective contactor means in the motor circuit would be opened. This overload relay contactor 68 is reset manually in order to again operate the door through the control circuits. The other control circuit contactors and motor circuit contactors are self resetting in that when they have returned to their respective normally open or closed position, the manually operated switches at the central station or local stations again set up the sequence of operations as described hereinbefore.

To open the door from central or bridge control the switch 47 is moved downwardly and connection is established between the power supply 49 through the switches and connection 46 normally closed switch 81, connection 82, normally closed switch 83 and connection 84, to energize the opening relay 86. In order to open the door from local control the switch handle is operated to open position which leaves switches 56 and 81 undisturbed but switch 91 is closed and switch 53 is opened. A circuit is thereby established from 49 through connection 90, switch 91, connections 92 and 84 and the opening relay 86 is energized. To open the door from the right hand side of the bulkhead door the same connections are established excepting that the switch 93 is closed to close the circuit between connections 94 and 84 to energize the opening relay 86.

To close the door or reverse the operation of the motor from central control, the switch 47 is moved to the upper contact whereupon a circuit is established through connection 45, switch 53, connection 52, switch 54, connection 63, contactor 64 and closing relay 65 which is energized. For local control in order to close the door from the left hand side of the door D the switch 56 is closed, which opens switch 81, whereupon a circuit is established from connections 49, 55, switch 56, connection 60, switch 53, connection 52, switch 54, connection 63, through the closing or reversing operating relay 65. To close the door from local control on the right hand side of the door the switch 58 is closed, which opens switch 83, and the circuit can readily be traced from 49 through 55, 57, 58, 59, 60, 53, 52, 54, 63, 64 and the closing relay 65.

The motor operated mechanism 100 is driven by the motor 10 and the limits of its movement or the device driven thereby, operates the limit switches 66 and 87. For a bulkhead door the limit switch 66 is operated by the door or the mechanism just prior to the closing of the door and the limit switch 87 is operated by the door or mechanism at or preferably adjacent to the limit of its opening movement.

It is clear that the closing control circuit may be duplicated and used for the door opening control circuit if desired. In bulkhead door operation for ships, however, this is not needed since it is the door closing operation which introduces danger to personnel who may be caught therebetween or in which obstructions in the doorway are likely to occur.

Although for bulkhead door and valve operation a control circuit for forward rotation and a control circuit for reverse rotation is necessary for complete operation, for operations requiring merely one direction of rotation of the motor, the control circuit for the so-called door closing operation may be used alone with its attendant operation and automatic control.

Figure 2:
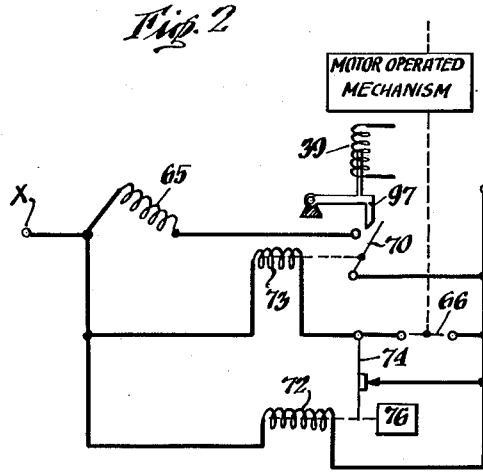
Figure 2 is a circuit diagram of a substitute portion for the motor control circuit of Figure 1.

Figure 2 shows a modification of the reversing control circuit which can be substituted between points x and y of the circuit of Figure 1. The change involves merely placing the door closing limit switch 66 in parallel with the time delay switch 74 rather than in series with the coil 65 or shunting switch 70. So placing the limit switch has the advantage of keeping the switch 70 closed even should the torque relay 39 be energized to release the latch 97 during door closing. In other words, in the circuit of Figure 1, should the door be obstructed so that the current drawn is heavy enough to energize the coil 39, the switch 70 opens so that when the door is adjacent closed position and the limit switch 66 opens, the door is closed to complete closed position by the inertia of the door, the motor and the door operating mechanism. With the circuit as modified with that of Figure 2, however, relay 73 continues to be energized to hold the switch 70 closed even if the relay 39 is operated and when the heavy current ceases to flow the latch 97 returns to latched position until the limit switch 66 opens after which the door closes with the full torque of the motor until the relay 39 is energized when the door meets the jamb to release the latch 97 as previously described. The circuit in all other respects operates as described with respect to the circuit of Figure 1.

Figure 3:
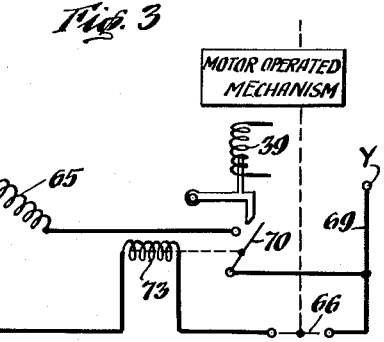
Figure 3 is a circuit diagram of a substitute portion for the motor control circuit of Figure 1.

Figure 3 shows a simplified circuit which likewise may be substituted between points x and y of the reversing control circuit of Figure 1. The circuit of Figure 3 is like that of Figure 2 but dispenses with the time delay relay 72 and switch 74. For door closing operation a minor disadvantage of this circuit exists in that should the operator release the manual switch in the closing operation just before the door is closed so that inertia carries the door to a position where the limit switch 66 opens but the door is not completely closed, then the door opening switch must be operated to partially open the door to a position where the switch 66 is again closed and then a reversing switch is again operated and held to close the door. With the circuit of Figure 2, and Figure 1 also, in the event that this occurs, the door can be fully closed by again operating a manual closing switch since the switch 74 shunting the closing limit switch 66 permits the door to be closed to full closed position with normal operation.

Figure 4:
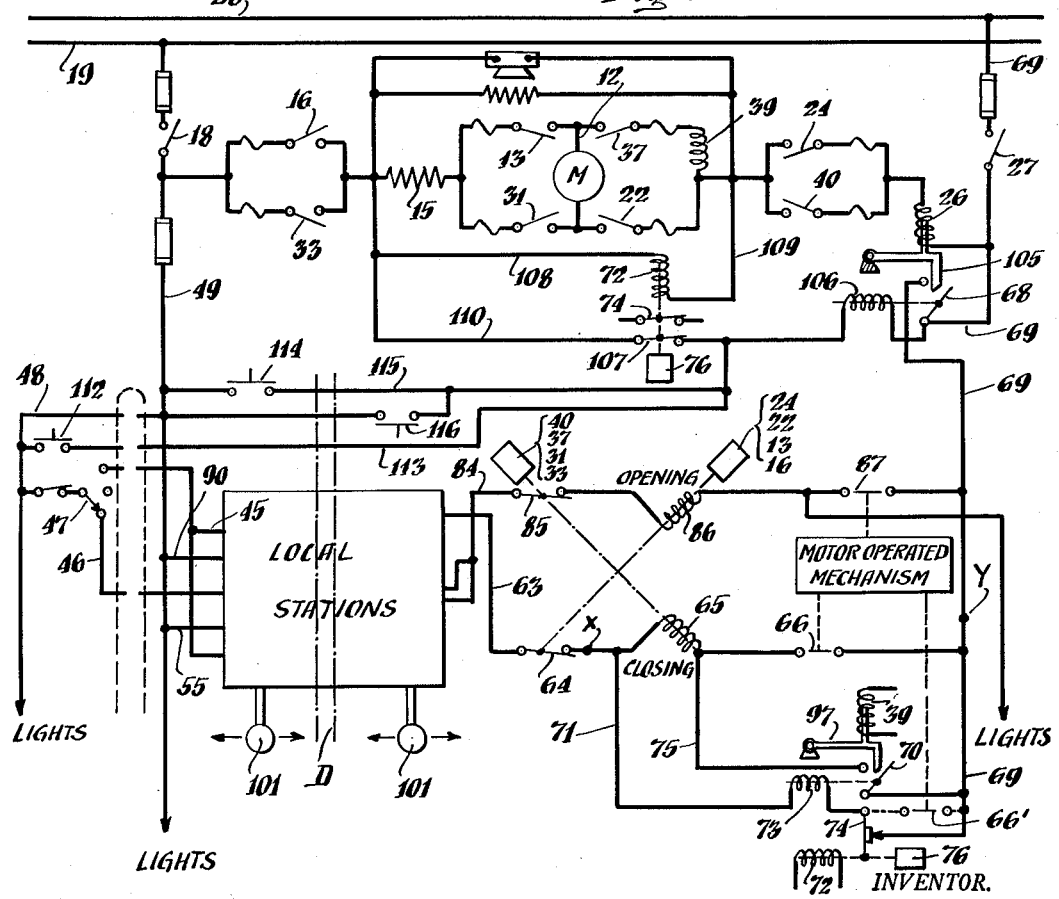
Figure 4 is a circuit diagram having a reset circuit and means for the overload contactor or switch.

Figure 4 shows a circuit essentially like that of Figure 1 and similar parts are similarly numbered. In this circuit the overload contactor or switch 68 has been substituted by a latchable and resettable switch or contactor. The purpose, therefore, is to enable the overload contactor or switch 68 to be closed or reset from a local station or from the central station, should it be opened due to an overload current through the motor circuit. The overload means of Figure 1 is the manually reset type and is located on the bulkhead panel. Should these compartments be flooded it may be impossible to close this switch and hence close the door. In order to avoid this possibility, means are provided for closing the overload switch or contactor 68 from the central station and from the local stations.

In this circuit, therefore, the overload relay 26 operates a latch 105 which permits the switch 68 to close when the relay 106 is energized but holds the switch 68 closed when once it is closed. In other words its operation is like that of switch 70 and latch 97. The relay is connected with the wire 69 and with the input side of the motor circuit through a normally closed switch 107 and wire 110. The switch 107 is opened after a predetermined initial delay of about four seconds and for this reason the relay 72 and dash-pot 76 may be used for this purpose as well as for switch 74. In other words, the relay 72 operates to open both switch 74 and 107 in about four seconds' time after the initial closing of the control or motor circuit. It is clear that separate relays may be used for this purpose if desired. Preferably the relay 72 is connected across the motor armature circuit through wires 108 and 109, although its connection in the shunt circuit as shown in Figures 1 and 2 may also be used. Even though the relays 72 and 74 are connected across a part of the motor circuit they constitute a part of the control circuit.

For manually resetting or closing the contactor 68, reset means are provided which preferably includes three manually operated switches shunting the switch 107 and shunting each other, one reset switch being provided at each of the stations. It is clear that but one reset switch may be provided at the central station; however, one is also provided at each of the local stations. The central station reset switch 112 is connected with the wire 48 and through wire 113 to the relay 106. A local station reset switch 114 is connected to the wire 49 and a wire 115 to the relay 106. The third and a local station reset switch 116 is also connected with the wire 49 and wire 115 to the relay 106. Reset switch 114 is provided upon one side of the bulkhead and switch 116 on the other side. If now the overload relay 26 should operate to release the latch 105 so that switch 68 opens, by manually closing one of the reset switch 112, 114 or 116, the relay 106 is energized to close the switch 68.

The circuit portion of Figures 2 or 3 may be substituted between points x and y of the circuit of Figure 4. Also the closing limit switch 66 may be connected in series with the voltage relay 73 and shunting the time delay switch 74 as in the circuit of Figure 2 and illustrated as 66'.

The closing limit switch 66 is connected in all of the control circuits shunting the torque contactor 70 either individually as in the particular circuit of Figures 1 and 4 or in series with the voltage torque relay 73 for the torque contactor or switch as in the circuit portions of Figures 2 and 3. There is then in each circuit a normally closed switch 74 or 76 in series with the voltage torque relay which opens after a predetermined period which in the case of Figures 1, 2 and 4 is a time delay switch 74 operable in about four seconds and which in the case of Figures 2 and 3 is a closing limit switch 66 operable when the door is adjacent to closed position. In fact Figure 2 shows both of these switches connected in parallel to each other and in series with the voltage relay 73.

In all of the circuits the switch means has a single output terminal for the forward or closing control circuit and a single output terminal for the reverse or opening control circuit. For usual bulkhead door operation the switch means will include two or more switches and usually three connected to the single output terminal for one direction of motor or door operation in such manner that the door may be operated from any one of two or three different stations namely from the bridge, one side of the door and the other side of the door. Similarly two or more and usually three switches, one at each of the same stations, are connected to a single terminal for operation of the motor or door in the other direction by operation of one of the switches. The shunt control circuit is connected into the control circuit by connection with the single output terminal either at the terminal or beyond the terminal to shunt at least the torque contactor. The shunt control circuit is in Figures 1, 2 and 3, the circuit 71, 73, 74, 72, 76, 69 and in Figure 3, the circuit 73, 66.

The circuits preferably have a light system associated therewith for indicating the operation of the door at both the local station at the door and at the central control station.

This invention provides an improvement in motor control circuit. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A motor control circuit comprising a circuit for a motor including normally open contactor means, and a torque relay connected in series with the contactor means which is energized upon a heavy operating current flow therethrough; a control circuit connected in shunt with the motor circuit including in series manually operated switch means having a single output terminal, an operating relay connected with the normally open motor circuit contactor means to close the same, and a normally open torque contactor; means to hold the torque contactor closed when closed and connected with the torque relay in the motor circuit for release of the holding means, and means connected in the control circuit with the single output terminal and shunting at least the torque contactor and operated upon closing of the manually operated switch means, said means being connected with the torque contactor to close the same and hold it closed for a predetermined period.

2. A motor control circuit comprising a circuit for a motor including normally open contactor means, and a torque relay connected in series with the contactor means which is energized upon a heavy operating current flow therethrough; a control circuit connected in shunt with the motor circuit including in series manually operated switch means, an operating relay connected with the normally open motor circuit contactor means to close the same, and a normally open torque contactor; latch means for the torque contactor to hold the same closed when closed and connected with the torque relay in the motor circuit for release thereof, a shunt circuit shunting the operating relay and the torque contactor and energized upon closing of the manually operated switch means including a relay connected with the torque contactor to close the same, and means opening the shunt circuit after a predetermined finite but short initial period.

3. A motor control circuit comprising a circuit for a motor including normally open contactor means, and a torque relay connected in series with the contactor means which is energized upon a heavy operating current flow therethrough; a control circuit connected in shunt with the motor circuit including in series manually operated switch means, an operating relay connected with the normally open motor circuit contactor means to close the same, and a normally open torque contactor; latch means for the torque contactor to hold the same closed when closed and connected with the torque relay in the motor circuit for release of the latch means, a first shunt circuit shunting the operating relay and the torque contactor including a time delay relay, a second shunt circuit shunting the operating relay and the torque contactor including a control circuit relay connected with the torque contactor to close the same, and a normally closed time delay contactor in series therewith and connected with and opened by the time delay relay.

4. A motor control circuit for a motor having a motor circuit including normally open contactor means for forward rotation of the motor and a motor circuit including normally open contactor means and a torque relay operable upon a heavy operating current flow therethrough for reverse rotation comprising a forward control circuit including in series manually operated switch means, a normally closed contactor, and a forward operating relay adapted to be connected with the contactor means in the forward motor circuit to close the same; a reversing control circuit including in series manually operated switch means, a normally closed contactor connected with the operating relay in the forward control circuit and opened thereby, a reversing operating relay connected with the normally closed contactor in the forward control circuit to open the same and adapted to be connected with the contactor means in the reversing motor circuit to close the same, and a normally open torque contactor; means to hold the torque contactor closed when closed and adapted to be connected with the torque relay in the motor circuit for release of the holding means, and means included in the reversing control circuit and operable upon closing of the switch means in the reversing control circuit to close the torque contactor and hold it closed for a predetermined short initial period.

5. A motor control circuit for a motor having a motor circuit including normally open contactor means for forward rotation of the motor and a motor circuit including normally open contactor means and a torque relay operable upon a heavy operating current flow therethrough for reverse rotation comprising a forward control circuit including in series manually operated switch means, a normally closed contactor, and a forward operating relay adapted to be connected with the contactor means in the forward motor circuit to close the same; a reversing control circuit including in series manually operated switch means, a normally closed contactor connected with the operating relay in the forward control circuit and opened thereby, a reversing operating relay connected with the normally closed contactor in the forward control circuit to open the same and adapted to be connected with the contactor means in the reversing motor circuit to close the same, and a normally open torque contactor; latch means for the torque contactor to hold the same closed when closed and connected with the torque relay in the motor circuit for release thereof, a shunt circuit shunting the reversing operating relay and the torque contactor including a relay connected with the torque contactor to close the same, and means initiated upon closing of the switch means in the reversing control circuit and opening the shunt circuit after a predetermined short initial period.

6. A motor control circuit for a motor having a motor circuit including normally open contactor means for forward rotation of the motor and a motor circuit including normally open contactor means and a torque relay operable upon a heavy operating current flow therethrough for reverse rotation comprising a forward control circuit including in series manually operated switch means, a normally closed contactor, and a forward operating relay adapted to be connected with the contactor means in the forward motor circuit to close the same; a reversing control circuit including in series manually operated switch means, a normally closed contactor connected with the operating relay in the forward control circuit and opened thereby, a reversing operating relay connected with the normally closed contactor in the forward control circuit to open the same and adapted to be connected with the contactor means in the reversing motor circuit to close the same, and a normally open torque contactor; latch means for the torque contactor to hold the same closed when closed and connected with the torque relay in the motor circuit for release thereof, a shunt circuit shunting the reversing operating relay and the torque contactor including a control circuit torque relay connected with the torque contactor to close the same, a normally closed contactor in series therewith, and means connected with the normally closed shunt contactor and initiated upon closing of the switch means in the reversing circuit to open the same after a predetermined short initial period.

7. A motor control circuit for a motor having a motor circuit including normally open contactor means for forward rotation of the motor and a motor circuit including normally open contactor means and a torque relay operable upon a heavy operating current flow therethrough for reverse rotation comprising a forward control circuit including in series manually operated switch means, a normally closed contactor, and a forward operating relay adapted to be connected with the contactor means in the forward motor circuit to close the same; a reversing control circuit including in series manually operated switch means, a normally closed contactor connected with the operating relay in the forward control circuit and opened thereby, a reversing operating relay connected with the normally closed contactor in the forward control circuit to open the same and adapted to be connected with the contactor means in the reversing motor circuit to close the same, and a normally open torque contactor; latch means for the torque contactor to hold the same closed when closed and connected with the torque relay in the motor circuit for release thereof, a first shunt circuit shunting the reversing operating relay and the torque contactor including a time delay relay, a second shunt circuit shunting the reversing operating relay and the torque contactor including a control circuit torque relay connected with the torque contactor to close the same, and a normally closed time delay contactor in series therewith and connected with and opened by the time delay relay.

8. A combination of reversing motor circuit and motor control circuit comprising a motor circuit for forward rotation of the motor including normally open contactor means, a motor circuit for reverse rotation including normally open contactor means and a motor circuit torque relay which is energized upon a heavy operating current flow therethrough; a forward control circuit including in series manually operated switch means, a normally closed contactor, and a forward operating relay connected with the contactor means in the forward motor circuit to close the same; a reversing control circuit including in series manually operated switch means, a normally closed contactor connected with the operating relay in the forward control circuit and opened thereby, a reversing operating relay connected with the normally closed contactor in the forward control circuit to open the same and also connected with the contactor means in the reversing motor circuit to close the same and a normally open torque contactor; means to hold the torque contactor closed when closed and connected with the torque relay in the motor circuit for release thereof, and means included in the reversing control circuit to close the torque contactor and hold it closed for a predetermined short initial period.

9. A combination of reversing motor circuit and motor control circuit comprising a motor circuit for forward rotation of the motor including normally open contactor means, a motor circuit for reverse rotation including normally open contactor means, and a motor circuit torque relay which is energized upon a heavy operating current flow therethrough; a forward control circuit including in series manually operated switch means, a normally closed contactor, and a forward operating relay connected with the contactor means in the forward motor circuit to close the same; a reversing control circuit including in series manually operated switch means, a normally closed contactor connected with the operating relay in the forward control circuit and opened thereby, a reversing operating relay connected with the normally closed contactor in the forward control circuit to open the same and also connected with the contactor means in the reversing motor circuit to close the same, and a normally open torque contactor; latch means for the torque contactor to hold the same closed when closed and connected with the torque relay in the motor circuit for release thereof, a shunt circuit shunting the reversing operating relay and the torque contactor including a relay connected with the torque contactor to close the same, and means opening the shunt circuit after a predetermined short initial period.

10. A combination of reversing motor circuit and motor control circuit comprising a motor circuit for forward rotation of the motor including normally open contactor means, a motor circuit for reverse rotation including normally open contactor means and a motor circuit torque relay which is energized upon a heavy operating current flow therethrough; a forward control circuit including in series manually operated switch means, a normally closed contactor connected with an operating relay in the reversing control circuit to be opened thereby, and a forward operating relay connected with the contactor means in the forward motor circuit to close the same; a reversing control circuit including in series manually operated switch means, a normally closed contactor, a reversing operating relay connected with the normally closed contactor in the forward control circuit to open the same and also connected with the contactor means in the reversing motor circuit to close the same, and a normally open torque contactor; latch means for the torque contactor to hold the same closed when closed and connected with the torque relay in the motor circuit for release thereof, a shunt circuit shunting the reversing operating relay and the torque contactor including a control circuit torque relay connected with the torque contactor to close the same, a normally closed contactor in series therewith, and means connected with the normally closed shunt contactor to open the same after a predetermined short initial period.

11. A combination of reversing motor circuit and motor control circuit comprising a motor circuit for forward rotation of the motor including normally open contactor means, a motor circuit for reverse rotation including normally open contactor means and a motor circuit torque relay which is energized upon a heavy operating current flow therethrough; a forward control circuit including in series manually operated switch means, a normally closed contactor, and a forward operating relay connected with the contactor means in the forward motor circuit to close the same; a reversing control circuit including in series manually operated switch means, a normally closed contactor connected with the operating relay in the forward control circuit and opened thereby, a reversing operating relay connected with the normally closed contactor in the forward control circuit to open the same and also connected with the contactor means in the reversing motor circuit to close the same, and a normally open torque contactor; latch means for the torque contactor to hold the same closed when closed and connected with the torque relay in the motor circuit for release thereof, a first shunt circuit shunting the reversing operating relay and the torque contactor including a time delay relay, a second shunt circuit shunting the reversing operating relay and the torque contactor including a control circuit torque relay connected with the torque contactor to close the same, and a normally closed time delay contactor in series with the control circuit torque relay and connected with and opened by the time delay relay.

12. A combination of reversing motor circuit and motor control circuit as in claim 11 including a motor operated mechanism, a limit switch connected in series in at least one of the control circuits and connected with the motor operated mechanism for operation upon a predetermined extent of rotation of the mechanism.

13. A motor control circuit comprising a circuit for a motor including normally open contactor means, and a torque relay connected in series with the contactor means which is energized upon a heavy operating current flow therethrough; a control circuit connected in shunt with the motor circuit including in series manually operated switch means having a single output terminal, an operating relay connected with the normally open motor circuit contactor means to close the same, and a normally open torque contactor; means to hold the torque contactor closed when closed and connected with the torque relay in the motor circuit for release of the holding means, a relay connected in the control circuit with the single output terminal and shunting at least the torque contactor and energized upon closing of the switch means, said shunt relay being connected with the torque contactor to close the same, and normally closed switch means in series with the shunt relay controlled to open upon a predetermined delay.

14. A motor control circuit as in claim 13 including a time delay means connected with the normally closed switch means to open the same after a predetermined period.

15. A motor control circuit as in claim 13 for a motor operated mechanism in which the normally closed switch means is a limit switch adapted to be connected with the motor operated mechanism and opened upon a predetermined movement thereof.

16. A motor control circuit as in claim 13 for a motor operated mechanism in which the normally closed switch means includes a limit switch adapted to be connected with the motor operated mechanism and opened upon a predetermined movement thereof and a time delay switch in parallel therewith which is opened after a predetermined short initial period.

17. A motor control circuit as in claim 13 including a limit switch connected in series with the operating relay and adapted to be opened upon a predetermined extent of movement of the motor operated mechanism.

18. A motor control circuit comprising a circuit for a motor including normally open contactor means, and a torque relay adapted to be connected in the motor circuit which is energized upon a heavy operating current flow therethrough; a control circuit including in series manually operated switch means, an operating relay connected with the normally open motor circuit contactor means to close the same, and a normally open torque contactor; means to hold the torque contactor closed when closed and connected with the torque relay in the motor circuit for release of the holding means; a shunt circuit in the control circuit paralleling the operating relay and the torque contactor including a relay connected with the torque contactor to close the same, and normally closed switch means in series therewith controlled to open upon a predetermined delay; an overload relay, an overload contactor in the control circuit, a latch to hold the torque contactor closed when closed and connected with the overload relay to release the latch and open the torque contactor; a reset circuit including a reset relay connected with the overload contactor to close the same, a time delay switch in series with the relay which opens after a predetermined short initial period, and manually operated reset switch means shunting the time delay switch and connected with the reset relay.

19. A motor control circuit as in claim 18 including a time delay relay means connected with the time delay switch and the switch means of the shunt circuit to close the same.

20. A motor control circuit as in claim 18 including a time delay relay connected with the time delay switch in the reset circuit and with the switch means in the shunt circuit to open the same.

21. A motor control circuit as in claim 18 in which the switch means in the shunt circuit includes a limit switch opened by the motor operated mechanism upon a predetermined movement thereof and a time delay switch in parallel therewith; and a time delay relay connected with both time delay switches to open the same after a predetermined initial period.

References Cited in the file of this patent

UNITED STATES PATENTS

| | | |
|---|---|---|
| 878,855 | Barnum | Feb. 11, 1908 |
| 923,186 | Kanmacher | June 1, 1909 |
| 931,994 | Cheney | Aug. 24, 1909 |
| 991,189 | Barnum | May 2, 1911 |
| 1,077,662 | Yates | Nov. 4, 1913 |
| 1,084,396 | Carichoff | Jan. 13, 1914 |
| 1,097,256 | Murphy | May 19, 1914 |
| 1,145,569 | Pate | July 6, 1915 |
| 1,227,810 | Lum | May 29, 1917 |
| 1,367,138 | Hanff | Feb. 1, 1921 |
| 1,610,080 | Eaton | Dec. 7, 1926 |
| 1,703,822 | Howe | Feb. 26, 1929 |
| 1,730,283 | McShane | Oct. 1, 1929 |
| 1,877,513 | Johnston | Sept. 13, 1932 |
| 1,943,096 | Stewart | Jan. 9, 1934 |
| 2,023,096 | Parsons | Dec. 3, 1935 |
| 2,534,751 | Barrows | Dec. 19, 1950 |